(No Model.) 3 Sheets—Sheet 1.
P. G. EMERY.
BRAKE HANDLE.
No. 558,371. Patented Apr. 14, 1896.
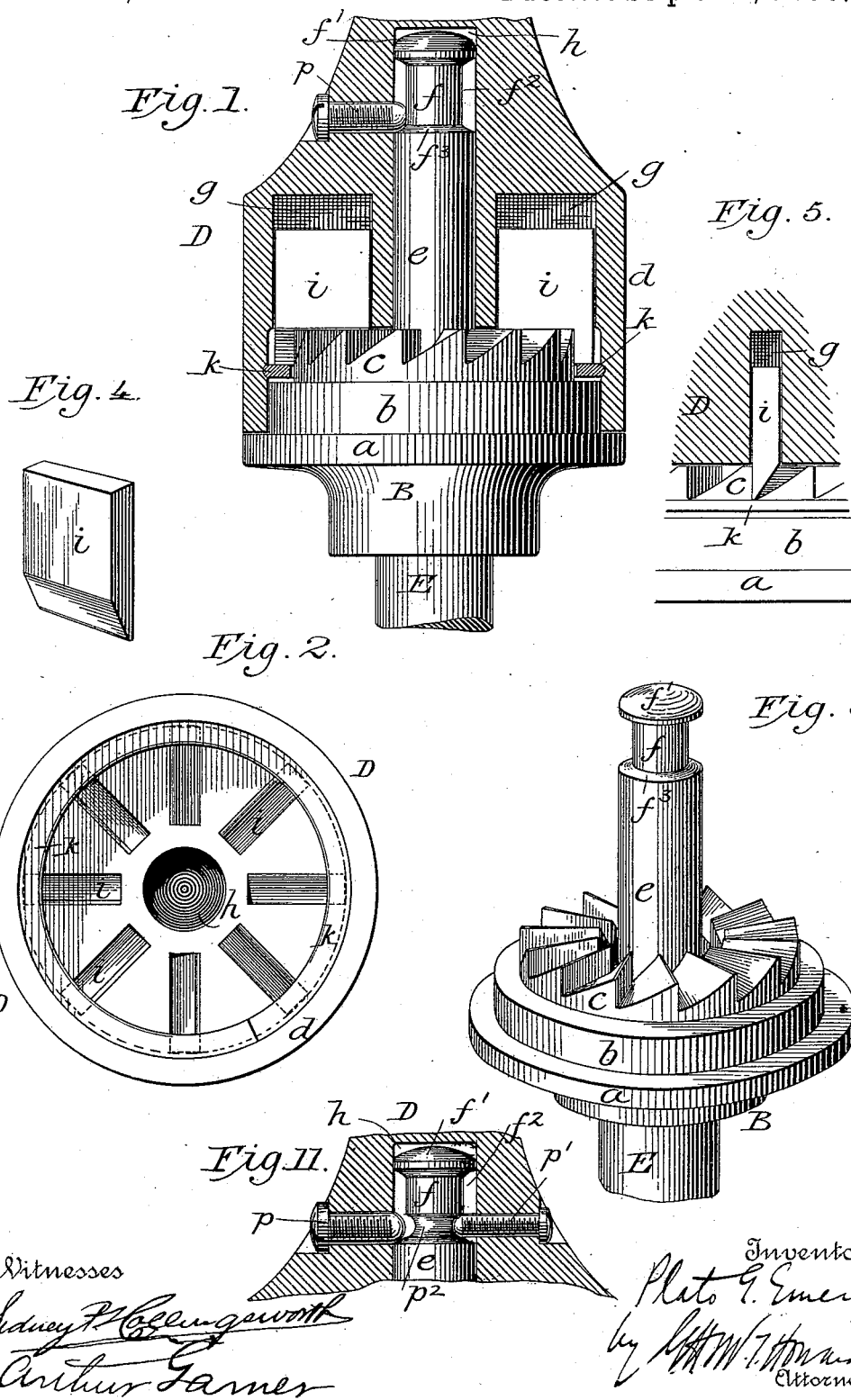

(No Model.) 3 Sheets—Sheet 2.

P. G. EMERY.
BRAKE HANDLE.

No. 558,371. Patented Apr. 14, 1896.

Witnesses
Inventor
Plato G. Emery,
Attorneys.

(No Model.) 3 Sheets—Sheet 3.

P. G. EMERY.
BRAKE HANDLE.

No. 558,371. Patented Apr. 14, 1896.

UNITED STATES PATENT OFFICE.

PLATO G. EMERY, OF CHICAGO, ILLINOIS, ASSIGNOR TO THE ADAMS & WESTLAKE COMPANY, OF ILLINOIS.

BRAKE-HANDLE.

SPECIFICATION forming part of Letters Patent No. 558,371, dated April 14, 1896.

Application filed November 30, 1895. Serial No. 570,680. (No model.)

*To all whom it may concern:*

Be it known that I, PLATO G. EMERY, of the city of Chicago, in the county of Cook and State of Illinois, have invented certain new and useful Improvements in Brake-Handles, of which the following is a specification, reference being had to the accompanying drawings and to the letters of reference marked thereon.

This invention relates to a brake-handle for use on street or other cars, which, when given rotation in one direction by the driver or brakeman, is operative upon the brake staff or rod, or some part secured rigidly thereto, to carry the brake-staff with it in rotation and thus cause the brakes to be set, but which will revolve loosely in an opposite direction or around upon the brake-staff without moving the latter.

In the accompanying drawings, Figure 1 is a view, mainly in vertical section, of my invention as applied to the upper end of a brake-staff. Fig. 2 is a plan, showing the under side of the socketed part of the upper or handle portion of the device. Fig. 3 is a perspective view of the lower or ratchet portion of the device adapted to engage with the upper or handle portion containing the pawls. Fig. 4 is a perspective view of one of the pawls. Fig. 5 is a view, partly sectional, showing a pawl in its pocket. Figs. 6 and 7 show a modified form of the invention. Figs. 8, 9, and 10 show a further modification. Fig. 11 shows a still further modification.

Similar letters of reference indicate similar parts in the respective figures.

Referring to Figs. 1 to 5, inclusive, E represents the brake staff or rod, upon which the chain operating the brake is usually wound. B is a hub, which, when in place, is rigidly attached to or forms a part of the staff E. The hub B has a shoulder or flange $a$, a part $b$ of smaller diameter above the flange or shoulder, and a ratchet $c$. The portion $e$ of the staff or rod E, which projects above or beyond the ratchet $c$, is of reduced diameter, and beyond said part $e$ is another portion $f$ of still smaller diameter, the outer end of said portion $f$ terminating in a button $f'$.

The handle portion of the device may be generally represented by D, which, so far as its general appearance is concerned, is of an approved form now in use. The inner or pivotal portion of said part D is formed into a socket or enlarged hollow boss $d$, the outer diameter of which is equal to that of the shoulder or flange $a$, while its inner diameter is that of the portion $b$, over which it fits. Within the socket or enlarged boss $d$ is formed, as shown, a series of pockets $g$ radiating from the center. The pockets $g$ may be formed within the socket or boss casting itself, or, if preferred, a separate casting containing the pockets may be inserted and secured within the socket $d$. A hole $h$ is placed centrally of the socket, into which hole projects the portion $f$ of the brake staff or rod, a threaded pin $p$ projecting into the elongated groove $f^2$ existing between the shoulder $f^3$ and the under side of the button $f'$. The groove $f^2$ is elongated to enable it, under certain forms of my invention, to perform a function hereinafter described. The projection of the threaded pin $p$ into the groove will, as is evident, lock the two parts of the device together, preventing their detachment, and at the same time allow a rotary movement of one upon the other. Within each pocket $g$ is inserted, so as to have free vertical movement therein, a pawl $i$, Fig. 4, the pawls being of a width equal to that of the teeth of the ratchet $c$. The pawls $i$ have free movement in a downward direction by gravity, and are prevented from dropping from their pockets $g$ by means of a cut spring-ring $k$, which is pushed and held within the socket, as shown, the ends of the spring being forced together and its resiliency causing it to bind tightly within the socket $d$. The ring $k$ is placed below the under face of the pockets $g$ such a distance as will allow the pawls $i$ the requisite downward movement to engage with the ratchet $c$.

It will be seen that when the parts are in the normal position indicated in Fig. 1—that is to say, when the socket portion $d$ is fitted over the portion $b$ of the hub B—the pawls $i$ will, by gravity, engage the ratchet $c$, so that a movement of the handle to the right will cause the brake staff or rod E to be revolved, thus winding up the brake-chain; but that when the handle is moved in the opposite direction the inclined rear faces of the pawls $i$ will ride over the teeth of the ratchet $c$, thus allowing free and inoperative movement of the handle, the brake staff or rod at this time remaining stationary. The action is very effective, there being, as heretofore, eight pawls, two of which are adapted to be in engagement together with the ratchet, each having a substantial width of operative surface, and the hold is therefore positive, while at the same time the back movement of the handle is accomplished without any sensible retarding effect.

It will be seen that by the use of a series of pawls, as here shown, two pawls will together engage teeth of the ratchet, while other pawls will stand ready for immediate engagement upon the slightest back rotary movement being given to the handle in order to obtain a new hold or bite for applying the brake, this being due to the fact that the number of the pawls is indivisable into the number of teeth of the ratchet. Under this construction the movement at the outer end of the handle, necessary to be made to obtain a new hold or bite, is greatly reduced.

It has been mentioned that in certain forms of this invention the groove existing between the shoulder $f^3$ of the reduced portion $f$ and the button $f'$ is elongated. The purpose of this construction is explained as follows: The projection of the threaded pin $p$ into said elongated groove, while admitting of the rotary movement of the socket or boss $d$ upon the hub part B, will also permit the vertical movement of the handle and socketed portion from the hub B. This will allow the pawls to be lifted entirely above the upper plane of the teeth of the ratchet $c$, which will permit the brake staff or rod E to be revolved backward without turning the handle.

Figs. 6 and 7 show a modification in which the pawls $i$ are constructed to move upwardly, having springs $l$ beneath them. Here the socket forms a part of the hub portion, and the part $b$ fitting in the socket is integral with the handle portion D. This modification also admits of the releasing and detaching movement just described. In these figures I have shown the pockets formed in a casting separate from the socket; but it is to be understood that they may be formed in the socket-casting, as in Figs. 1, 2, and 5.

Fig. 11 illustrates a mode by which the vertical releasing and detaching movement may be allowed or prevented at pleasure.

Figure 6:
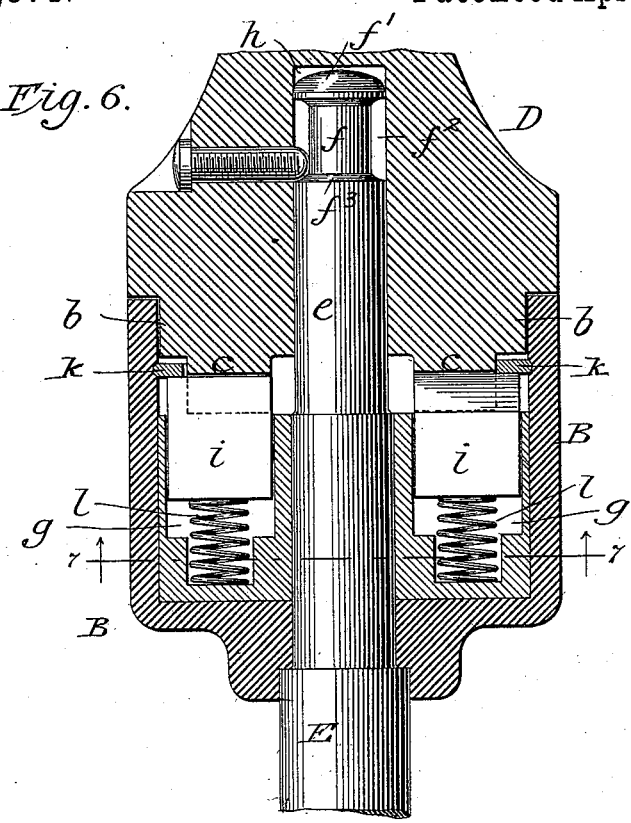
Figure 7:
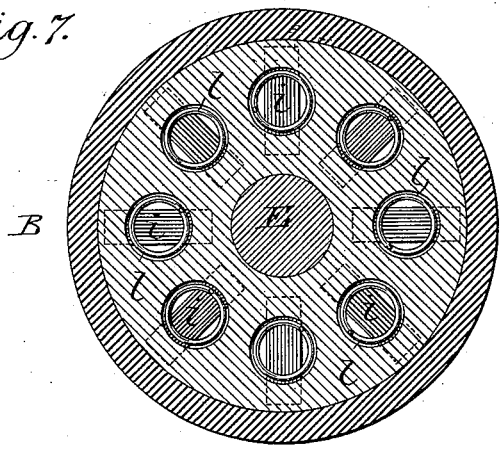
Figure 8:
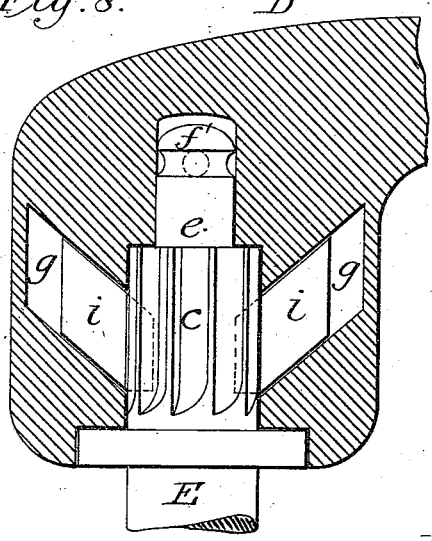
Figs. 8 and 9 show a further modification, in which the pawls $i$, which are in inclined pockets, are adapted to engage by gravity with the ratchet $c$, the teeth of which stand vertically. Instead of placing the pawls in an inclined position they might be put in a horizontal plane and springs inserted behind them to force them into engagement with the ratchet.
Figure 9:
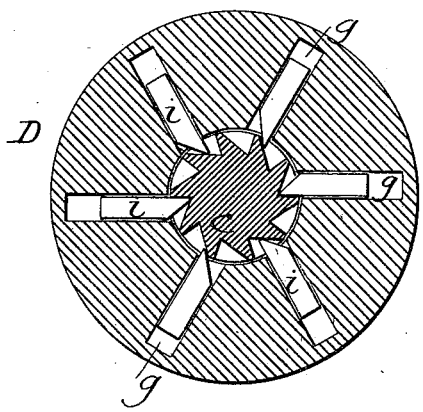
Figure 10:
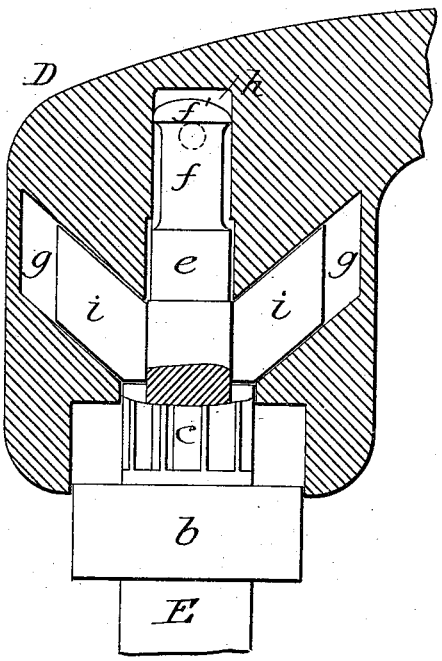
Fig. 10 shows a modification in which the inclined pawls may be lifted from engagement with the ratchet.

The threaded pin $p$ acts as hereinbefore described, while by the use of a supplemented threaded pin $p'$, entering a groove $p^2$ in the portion $e$ of the staff or rod, the said movement may be prevented.

In either form of my invention there is but little lost motion in the operative and engaging devices, and the actions sought are produced with the minimum of friction and noise. The pawls are preferably made of steel, as, indeed, may be all the operative parts, although I have found that excellent results are produced by making the ratchet of brass or composition metal homogeneous with the hub or handle part, as the case may be.

The entire device is simple in construction, strong and durable, and may be manufactured at comparatively small cost.

I do not restrict myself to the exact details entering into this invention as here described. Thus the ratchet may be detached from the hub or the handle portion instead of being integral therewith. The pocket-casting in which the pawls rest and operate may be separate from the socket or enlarged hollow boss and inserted therein, and brazed or otherwise secured thereto. The number of pawls may be varied, and instead of the ring $k$, for limiting the downward movement of the pawls, any equivalent device may be substituted. Thus a pin or corresponding feature may be used for this purpose for each pawl.

Other departures from my invention, as here described, are allowable, and will suggest themselves to the skilled mechanic without the exercise of the inventive faculty, and therefore such I consider to be within the scope of my invention.

Having thus described my invention, what I claim is—

1. A brake-handle having an enlarged pivotal portion, and a brake staff or rod having an enlarged hub portion, the two portions being connected together in such manner that one may be rotated independently of the other, a series of independently-acting pawls between the two portions, the said pawls being seated in cavities in one of them, but disconnected therefrom, a ratchet secured to the other portion, and a removable support for retaining the pawls in place when the handle is separated from the staff, substantially as shown and described.

2. A brake-handle having an enlarged pivotal portion, and a brake staff or rod provided with a hub portion and a pivot or pin entering said enlarged pivotal portion of the brake-handle, the handle being capable of a limited movement from the brake staff or rod in the axial line of the latter, combined with a ratchet and a series of pawls confined between said enlarged pivotal portion of the brake-handle and said hub portion of the brake staff or rod, and means for permitting rotation of the brake-handle around the brake staff or rod and preventing their detachment, substantially as set forth.

3. A brake-handle having an enlarged pivotal portion, a brake staff or rod provided with a hub portion and a pivot or pin entering said enlarged pivotal portion of the brake-handle and having an elongated groove, combined with a ratchet and a series of pawls confined between the enlarged pivotal portion of the brake-handle and the hub portion of the brake staff or rod, and a pin carried by the handle portion and entering the said elongated groove, whereby rotation of the brake-handle around the brake staff or rod is permitted and also a movement of the handle from said brake staff or rod in the axial line of the latter is allowed to an extent sufficient to move apart and render inoperative the members of the ratchet mechanism, substantially as set forth.

4. A brake-handle having an enlarged pivotal portion, and a brake staff or rod provided with a hub portion and a pivot or pin entering the enlarged pivotal portion of the brake-handle, the brake-handle being capable of a limited movement from the brake staff or rod in the axial line of the latter, combined with means whereby said limited movement may be checked or prevented, and with a ratchet-and-pawl mechanism confined between the enlarged pivotal portion of the brake-handle and the hub portion of the brake staff or rod, substantially as set forth.

In testimony whereof I hereto set my hand and seal.

PLATO G. EMERY. [L. S.]

Witnesses:
   F. W. G. PHILLIPS,
   G. HENRY GILS.